United States Patent [19]
Vaughn et al.

[11] 4,333,649
[45] Jun. 8, 1982

[54] RACKET STRING CLAMP

[75] Inventors: George A. Vaughn, Princeton; Francis J. Fuchs, Jr., Princeton Junction, both of N.J.

[73] Assignee: AMF Incorporated, White Plains, N.Y.

[21] Appl. No.: 192,689

[22] Filed: Oct. 1, 1980

Related U.S. Application Data

[63] Continuation-in-part of Ser. No. 128,158, Mar. 7, 1980, abandoned.

[51] Int. Cl.³ .............................................. A63B 51/00
[52] U.S. Cl. .............................. 273/73 D; 24/115 M; 403/368
[58] Field of Search ................ 273/73 R, 73 C, 73 D, 273/73 E, 73 A, 80.2, 80.5, 80.8; 128/325, 346, 354; 403/368, 374; 24/115 R, 115 A, 115 G, 115 M

[56] References Cited

U.S. PATENT DOCUMENTS

| | | | |
|---|---|---|---|
| 833,548 | 10/1906 | Putnam | 403/368 |
| 1,526,734 | 2/1925 | Andrews et al. | 273/73 D |
| 2,828,147 | 3/1958 | Peiffer | 403/368 X |
| 3,136,040 | 6/1964 | Bauer et al. | 128/354 X |
| 3,147,527 | 9/1964 | Gilmore | 403/368 |
| 3,548,484 | 12/1970 | Carlton | 273/73 D X |
| 3,616,497 | 11/1971 | Esposito | 128/346 X |
| 3,703,748 | 11/1972 | Kelly | 403/368 |
| 3,760,811 | 9/1973 | Andrew | 128/346 X |
| 3,815,609 | 6/1974 | Chester | 128/354 |
| 3,994,495 | 11/1976 | Stoffel | 273/73 D X |
| 4,188,953 | 2/1980 | Klieman et al. | 128/325 |
| 4,236,281 | 12/1980 | Bottum | 24/115 R |

FOREIGN PATENT DOCUMENTS

| | | | |
|---|---|---|---|
| 855446 | 2/1940 | France | 273/73 D |
| 23260 | of 1908 | United Kingdom | 273/73 D |
| 498430 | 1/1939 | United Kingdom | 273/73 D |
| 887526 | 1/1962 | United Kingdom | 273/73 D |

Primary Examiner—Richard J. Apley
Attorney, Agent, or Firm—Carella, Bain, Gilfillan & Rhodes

[57] ABSTRACT

A racket string clamp including a plurality of wedges for being inserted into a hole extended through a game ball racket frame and for being wedged between the end portion of a game ball string and the surface of the racket frame defining the hole to secure the end portion of the string to the racket frame, and further including handle means including a plurality of handle members equal in number to the wedges and formed integrally therewith and for maintaining the wedges in a predetermined relationship with respect to each other, the wedges and handle means having inner surfaces providing in combination a passageway for receiving the string, the rearward portions of the handle members being formed integrally to provide a pivot about which the handle members and wedges pivot away from and toward each other in tweezer-like action, upon the handle members and wedges pivoting away from each other, the string is provided access to the passageway and upon the string being received within the passageway the handle members and wedges pivot toward each other to align the inner surfaces of the wedges and handle members with the string received within the passageway, and the handle means for being gripped by an operator to slide the aligned wedges and handle members along the string and to insert the aligned wedges into the hole extending through the game ball racket frame; and upon the wedges being inserted into the hole, the handle means are for being moved back and forth with respect to the inserted wedges by the operator to break the handle means away from the wedges.

8 Claims, 12 Drawing Figures

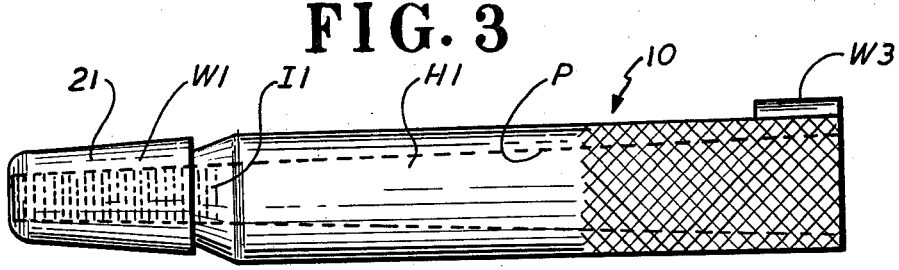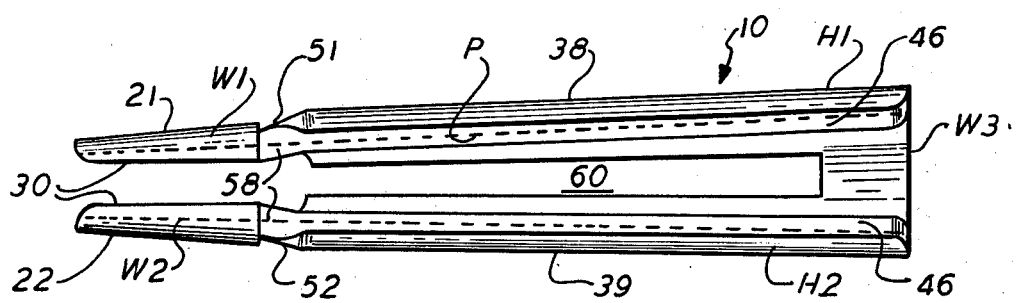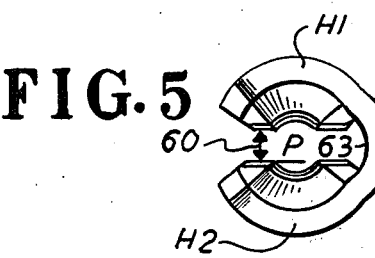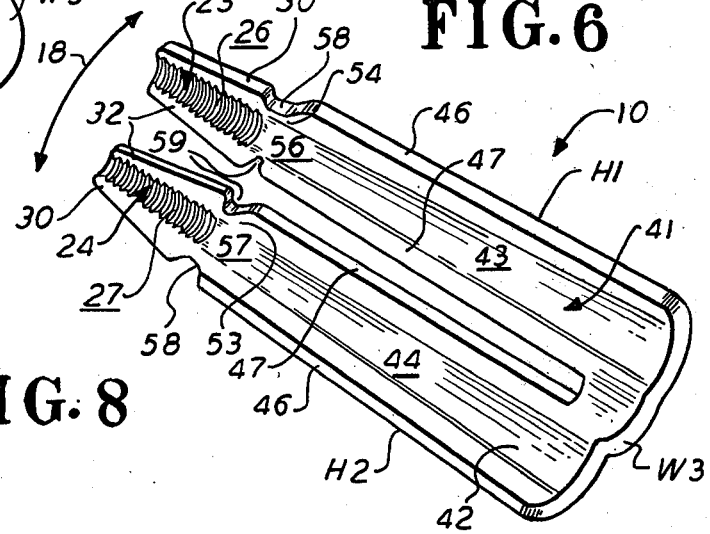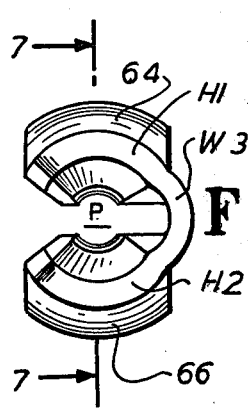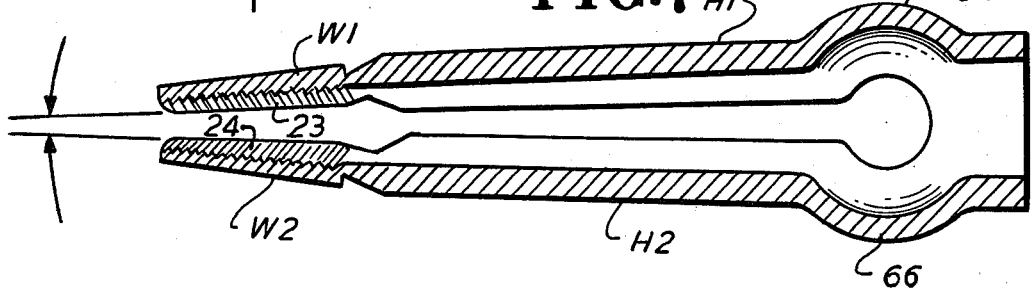

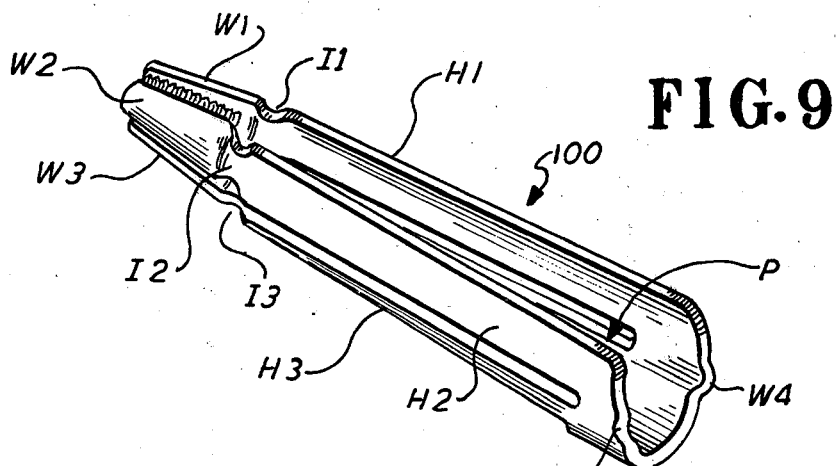
FIG. 9
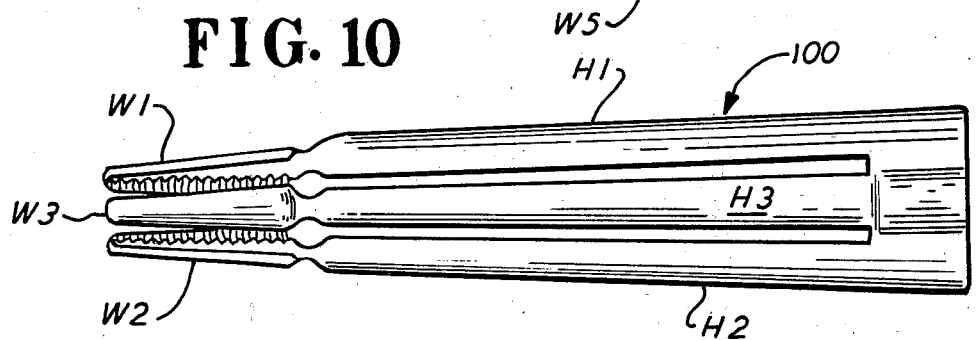
FIG. 10
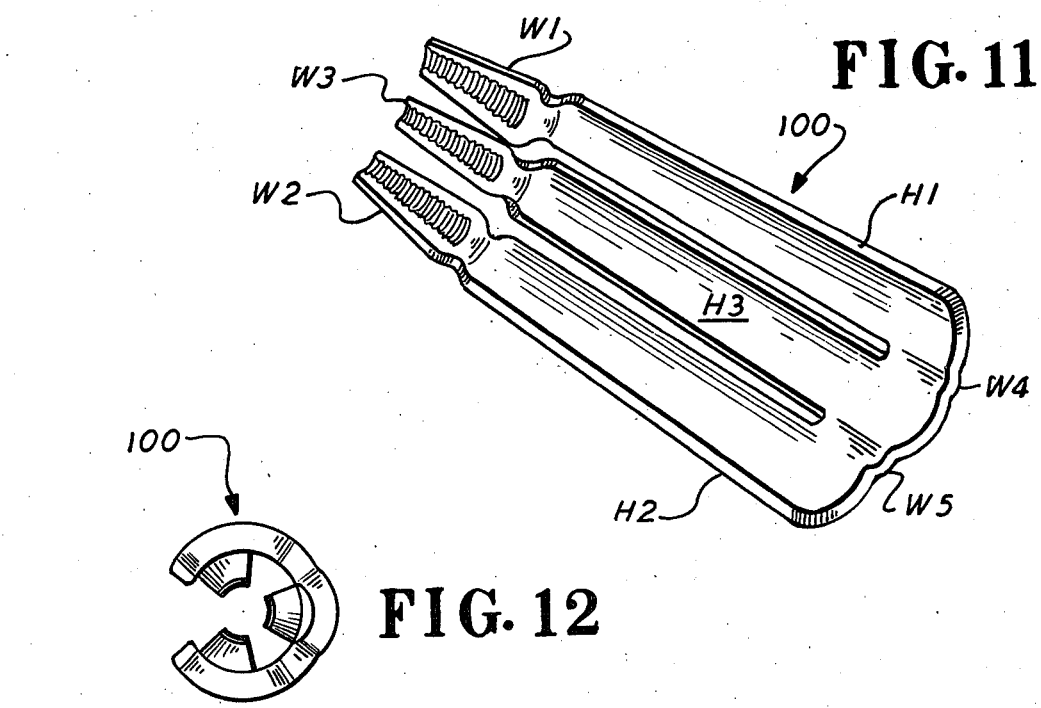
FIG. 11
FIG. 12

RACKET STRING CLAMP

CROSS REFERENCE TO RELATED APPLICATION

This application is a continuation-in-part application of patent application Ser. No. 128,158 filed Mar. 7, 1980 entitled TWEEZER-WEDGES and assigned to the same assignee as the present application, now abandoned.

BACKGROUND OF THE INVENTION

1. Field of the Invention

This invention relates to clamping apparatus for clamping the ends of individual game ball strings to the frame of a game ball racket.

2. Description of the Prior Art

As is known to those skilled in the art, and as disclosed in British Specification No. 23,260 having an application date of Oct. 31, 1908; British Specification No. 887,526 having an application date of Dec. 19, 1958; and U.S. Pat. No. 3,994,495 issued Nov. 30, 1976; clamping apparatus are known to the prior art for clamping the ends of individual game ball strings to the frame of a game ball racket.

Most pertinent to the present invention are the pair of opposed, tapered wedges disclosed in the above-referenced U.S. patent which wedges are for being received within a tapered passageway or hole formed in the frame of the game ball racket to wedgingly engage the end, or end portion, of the game ball string to clamp the string to the frame of the game ball racket. As is known to those who have attempted to use such prior art wedges, the wedges are quite small in size and are difficult for an operator to handle and align with the string prior to inserting the wedges and string into the tapered hole. The alignment of the wedges with the string requires the use of the fingers of both hands of an operator and upon being aligned, the wedges must then be transferred to the fingers of one hand of the operator to permit the other hand of the operator to be free to hold the string while the wedges are slid along the string and initially inserted into the tapered hole. It has been found that the transfer of the wedges from the fingers of two hands to the fingers of one hand frequently results in a wedge, or wedges, being dropped requiring the wedge-string alignment process to be begun again. This process can be very time consuming and tiring ofttimes to the point of operator frustration. It is believed that the difficulty that operators have encountered with the handling of such wedges has contributed greatly to the lack of any extensive use of such wedges in the stringing of game ball racket strings.

A further problem encountered with such prior art wedges is that for effective wedging action the wedges must be aligned axially with respect to each other and on diametrically opposed sides of the string. If the wedges are not so aligned, effective wedging action is not obtained and the clamped string tends to loosen upon being tensioned causing the string to pull out of the hole. In this event, the stringing action must be repeated and while this is troublesome and costly if it occurs in the factory during manufacture, it is even more troublesome and injurious to racket sales if it occurs after the sale of the racket and during play.

A still further problem associated with such prior art wedges is that, as illustrated in the above-referenced British Specification No. 23,260 and U.S. Pat. No. 3,994,495, after the wedges are initially inserted into the tapered hole, a separate wedge inserting device is generally required to fully insert the wedges into the tapered hole to wedgingly engage and clamp the string to the racket frame. The use of such wedge inserting devices adds additional manufacturing steps and hence cost to the stringing operation and requires additional operator manipulative skills the use of which can further contribute to operator tiring and frustration.

SUMMARY OF THE INVENTION

The above-noted problems associated with the prior art wedges for clamping the ends of individual strings of the game ball racket to the frame of the racket are solved by the tweezer-wedges of the present invention. In one embodiment, the tweezer-wedges of the present invention include a pair of opposed, tapered wedges and a pair of tweezer-like handles secured to the rear ends of the wedges which handles axially align the wedges in substantially diametrical opposition. Upon the tweezer-like handles being opened, they permit the string to be received within the wedges and upon being closed, the treezer-like handles axially align the wedges on diametrically opposite sides of the string. The tweezer-like handles are easily handled or manipulated by the fingers of a single hand of an operator to slide the aligned wedges along the string and to insert the wedges into the tapered hole formed in the racket frame to cause the wedges to wedgingly engage the string and clamp the string to the racket frame. Afterwards, the tweezer-like handles are easily and readily broken off and away from the inserted wedges by being moved back and forth with respect to the inserted wedges to break the tweezer-like handles away from the inserted wedges. In another embodiment, the tweezer-wedges of the present invention may include three or more wedges maintained in generally axial and annular alignment by the tweezer-like handles and which embodiment functions in the same manner as the two wedge embodiment.

DESCRIPTION OF THE DRAWINGS

FIGS. 3, 4 and 5 are, respectively, side, top and end views showing in detail the structure of an embodiment of the tweezer-wedges of the present invention;

FIG. 6 is a diagrammatic illustration of an embodiment of the tweezer-wedges of the present invention which tweezer-wedges have been opened from their normal position to show in detail the internal structure of the tweezer-wedges;

FIG. 7 is a side, cross-sectional view of another embodiment of the tweezer-wedges of the present invention;

FIG. 8 is a view showing how the end of the tweezer-wedges embodiment of FIG. 7 would look were the embodiment to be shown complete and not in cross-section; and FIGS. 9, 10, 11 and 12 are respectively, perspective, bottom, diagrammatic and end views of another alternate embodiment of the present invention.

DESCRIPTION OF THE INVENTION

Figure 1:
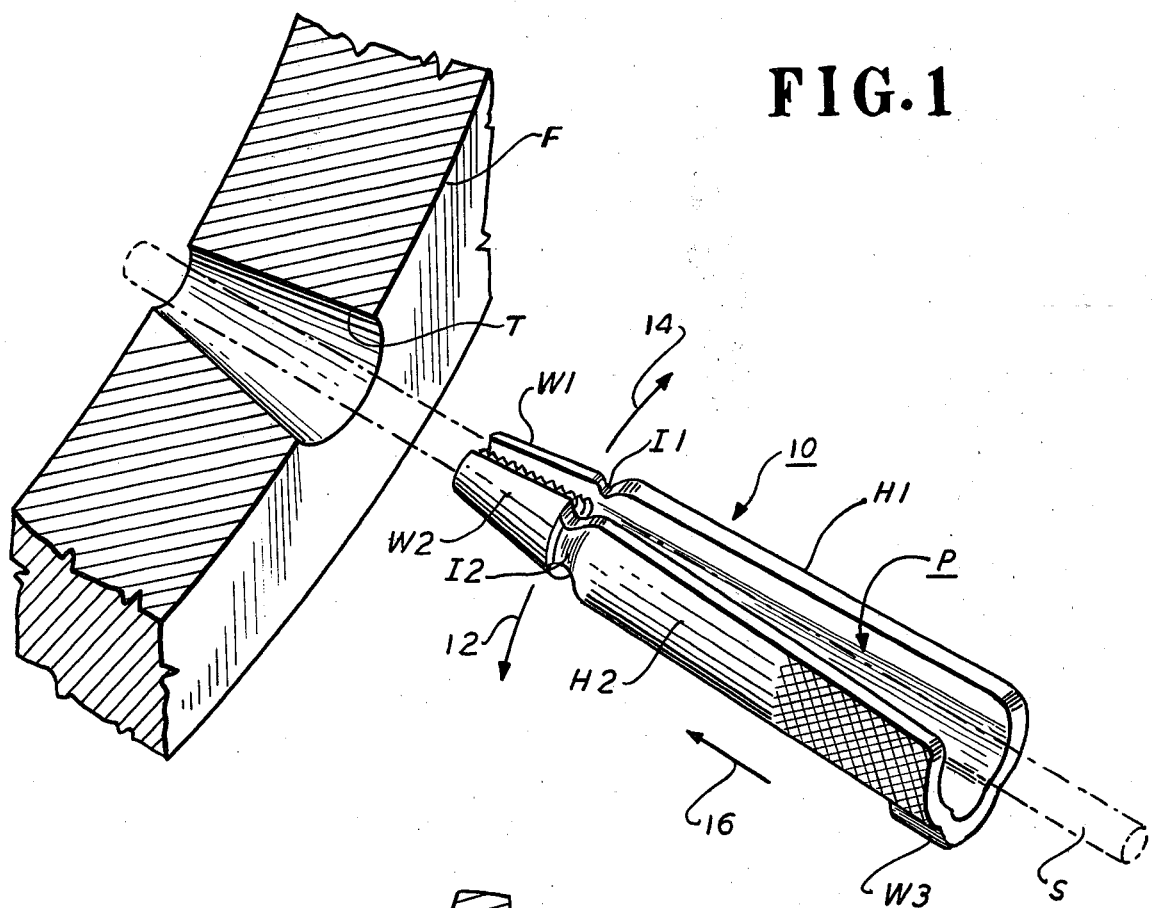
FIGS. 1 and 2 are diagrammatic illustrations showing the general structure of one embodiment of the tweezer-wedges of the present invention and illustrating the manner in which an operator manipulates the tweezer-wedges to receive a game ball racket string to align the wedges with the string and insert the wedges into a tapered hole extending through a game ball racket frame, the game ball racket frame being shown in cross section and only in a partial view.
Figure 2:
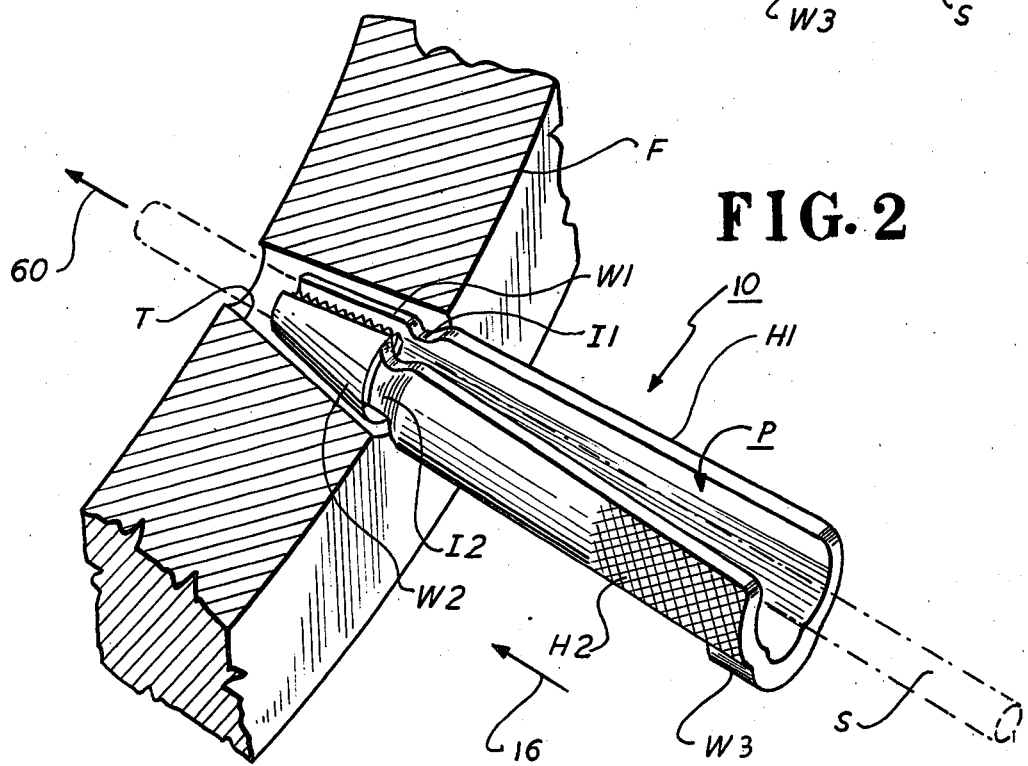

Referring now to FIGS. 1 and 2, there is shown a first embodiment of tweezer-wedges embodying the present invention and being identified by general numerical designation 10. Also shown in cross section is a partial view of a game ball racket frame F having a tapered passageway or hole T extending therethrough for having the end portion of a game ball string S wedgingly clamped therein to string the racket.

The tweezer-wedges 10 may include a pair of opposed, tapered wedges W1 and W2 for wedgingly engaging the end of the game ball string S to secure the end portion of the string to the racket frame F upon the wedges being inserted into the tapered hole T as illustrated in FIG. 2. The tweezer-wedges 10 further include tweezer-like means, such as a pair of opposed handles H1 and H2 having their forward portions secured to the rearward portions of wedges W1 and W2, such as being formed integrally therewith, to orient and align the inner surfaces of the wedges axially and angularly with respect to each other, and having their rearward portions secured together, such as by integrally formed web W3, to provide a pivot which in turn provides tweezer-like action to the wedges and handles.

The inner surfaces of the wedges W1 and W2 and handles H1 and H2 provide, in combination, a passageway indicated by general numerical designation P extending through the wedges and the handles, and upon the wedges and handles being spread apart in tweezer-like action about the pivot or web W3 in the direction of the arrows 12 and 14 of FIG. 1, the passageway P receives the string S and upon the wedges and handles being closed about the pivot or web W3 in tweezer-like action, the inner surfaces of the wedges W1 and W2 are aligned axially with respect to the string and to each other and are aligned angularly in a diametrically opposed relationship.

The handles H1 and H2 may be readily and easily gripped by the single hand of an operator to slide the wedges along the string in the direction of the arrow 16 of FIGS. 1 and 2 to insert the wedges and the end portion of the string into the tapered hole T to clamp and secure the end portion of the string S to the racket frame F.

Upon the wedges W1 and W2 being inserted into the tapered hole T, the handles H1 and H2 are for being moved back and forth by the operator with respect to the inserted wedges to break the handles away from or off of the wedges thereby completing the securing of the string S to the racket frame F. To facilitate the breaking off or away of the handles H1 and H2 from the inserted wedges W1 and W2, the tweezer-like wedges 10 may further include intermediate portions I1 and I2 of reduced cross section provided intermediate the rearward portions of the wedges W1 and W2 and the forward portions of the handles H1 and H2. These intermediate portions I1 and I2, being of reduced cross section as compared to the cross sections of the wedges W1 and W2 and the handles H1 and H2, are easily broken facilitating the breaking off or away of the handles H1 and H2 from the inserted wedges W1 and W2.

As shown in FIGS. 1 and 2, the inner surfaces of the wedges W1 and W2 may be provided with teeth or ridges to enhance the wedging engagement of the wedges with the string, and the rearward portions of the handles H1 and H2 may be knurled to enhance the gripping of the handles by the operator.

A better understanding of the detailed structure of the tweezer-wedges 10 of the present invention may be obtained by referring to FIGS. 3–5, and particularly to FIG. 6 wherein the tweezer-wedges 10 are shown spread apart, in the directions indicated by arrow 18, to better show the structural detail and the configurations of the inner surfaces of the wedges W1 and W2, the intermediate portions I1 and I2 and the handles H1 and H2.

More particularly, it will be noted that the opposed, spaced apart tapered wedges W1 and W2 are provided with substantially conical outer surfaces 21 and 22 (FIG. 4), and substantially cylindrical opposed inner surfaces indicated by general numerical designations 23 and 24 (FIG. 6) providing a first pair of opposed grooves 26 and 27 extending generally longitudinally of the wedges. As may be best seen in FIG. 6, the wedges are further provided with first and second pairs of opposed, spaced apart generally longitudinally extending edges 30—30 and 32—32.

The handles H1 and H2, as may be best understood from FIGS. 4 and 6, are a pair of opposed, spaced apart, generally longitudinally extending, semi-cylindrical handles tapering toward each other (FIG. 4) and being linearly aligned with the wedges W1 and W2 as shown in FIG. 4. The handles are respectively provided with substantially cylindrical outer surfaces 38 and 39 (FIG. 4) and substantially cylindrical opposed inner surfaces indicated by general numerical designations 41 and 42 (FIG. 6) providing a second pair of opposed grooves 43 and 44 extending generally longitudinally of the handles. The handles H1 and H2, as may be best seen in FIG. 6, are further provided with first and second pairs of opposed, spaced apart, generally longitudinally extending edges 46—46 and 47—47.

The intermediate members I1 and Is (FIG. 4) and as may be best seen FIGS. 4 and 6, are provided intermediate the rearward ends of the wedges W1 and W2 and the forward ends of the handles H1 and H2 and may be formed integrally therewith as shown. The intermediate members I1 and I2 are provided with substantially cylindrical outer surfaces 51 and 52 (FIG. 4), and substantially cylindrical opposed inner surfaces 53 and 54 (FIG. 6), providing a third pair of opposed grooves 56 and 57 (FIG. 6) extending generally longitudinally of the intermediate members. The intermediate members are further provided with first and second pairs of opposed, spaced apart, generally longitudinally extending edges 58—58 and 59—59.

The web W3, as may be best seen in FIG. 5, is of generally semi-circular configuration having a substantially cylindrical outer surface 61 and a substantially cylindrical inner surface 62. As may be best seen in FIG. 6, the web W3 may be formed integrally with the handles H1 and H2 at the rearward ends thereof between the rearward ends of the second pair of edges 47—47 provided on the handles H1 and H2. As noted above, the web W3 provides a pivot permitting the wedges W1 and W2, intermediate members I1 and I2, and the handles H1 and H2, to pivot toward and away from each other in springy, tweezer-like action.

As may be best understood from FIG. 6, the pair of opposed grooves 26 and 27 provided on the inner surfaces of the wedges W1 and W2, the pair of opposed grooves 56 and 57 provided on the inner surfaces of the intermediate members I1 and I2 and the opposed grooves 43 and 44 provided on the inner surfaces of the handles H1 and H2 provide in combination the longitudinally extending internal passageway indicated by general numerical designation P in FIGS. 1, 2, 4 and 5, which passageway P tapers generally inwardly from the rearward ends of the handles toward the forward end of the wedges as is best shown in FIG. 4.

As may be best understood from FIGS. 4 and 5, the first pairs of opposed, spaced apart, generally longitudinally extending edges 30—30, 58—58, and 46—46, provided respectively on the wedges W1 and W2, intermediate members I1 and I2, and handles H1 and H2, are generally linearly aligned and provide, in combination, a slot 60 extending longitudinally the entire length of the wedges, intermediate members and handles. The slot 60 tapers generally inwardly from the rearward end of the handles toward the forward end of the wedges with the rearward portion of the slot being wider than the diameter of the game ball string S and the forward portion of the longitudinal slot being narrower than the diameter of the game ball string. It will be further understood, and as is best seen in FIG. 5, that the slot 60 opens along its entire length into the entire length of the passageway P providing access for the string S to the passageway P.

As may be best understood from FIGS. 1 and 4, and in particular FIG. 1, upon the string being inserted into the wider portion of the longitudinal slot 60, and upon the string being forced against the opposed edges providing the narrower forward portion of the slot 60, the wedges, intermediate members and handles are pivoted away from each other about the web W3 in tweezer-like action to open the narrower portion of the longitudinal slot 60 to permit the string to be received within the internal passageway P, and, upon the wedges, intermediate members and handles pivoting towards each other about the web in tweezer-like action, the internal passageway P aligns the respective inner surfaces of the wedges, intermediate members and handles with respect to the game ball string S, and upon the string being received within the internal passageway P, the outer surfaces of the handles H1 and H2 may be gripped by a single hand of an operator to slide the tweezer-wedges 10 along the string and to insert the wedges into the tapered hole T extending through the frame of the game ball racket F. As noted above, upon the wedges being inserted into the tapered hole, and upon the handles being moved back and forth with respect to the inserted wedges, the intermediate members of reduced-cross section break off from the rearward ends of the wedges to separate the intermediate members and handles from the inserted wedges.

Referring now to FIG. 7, there is shown a second and further embodiment of the tweezer-wedges of the present invention, wherein the handles H1 and H2 are respectively provided with radially outwardly extending projections 64 and 66 (also note FIG. 8) which projections reside in the plane substantially perpendicular to the inner surfaces 23 and 24 of the wedges W1 and W2 respectively. The projections 64 and 66 are for orienting the handles H1 and H2 with respect to the hand of the operator to facilitate the handles being moved back and forth with respect to the inserted wedges W1 and W2 (FIG. 2) through an arc substantially residing in a plane parallel to the opposed inner surfaces 23 and 24 of the wedges to reduce any tendency of the inserted wedges to back out of the tapered hole T caused by any movement of the inserted wedges due to the breaking away of the intermediate members from the wedges. It having been discovered, that upon the handles H1 and H2 being moved back and forth in an arc substantially residing in a plane perpendicular to the opposed inner surfaces of the wedges, the wedges tend to back out of the tapered hole and reduce, even destroy, the clamping or wedging action of the wedges in securing the string to the racket frame F.

As is also shown in FIG. 7, the opposed, inner surfaces 23 and 24 of the wedges W1 and W2 may taper inwardly, from the rearward to the forward ends of the wedges, such that, upon the wedges, intermediate members and handles being spread apart in the above-described tweezer-like action, the inner surfaces 23 and 24 of the wedges W1 and W2 are substantially parallel thereby enhancing the alignment of the inner surfaces of the wedges W1 and W2 with the string S upon the string being received within the passageway P.

Referring again to FIGS. 1 and 2, it will be further understood by those skilled in the art, that the tapered passageway T may be formed either directly through the game ball racket frame F or may be formed as a tapered internal passageway extending through a grommet extending through a cylindrically shaped hole extending through the game ball racket frame F.

Further, it will be understood that upon the wedges W1 and W2 being inserted into the tapered passageway T by an operator gripping the handles H1 and H2, and upon tension (in the direction of arrow 60 of FIG. 2) being applied to the string S, such as by a racket stringing machine in a typical racket stringing operation, the wedges W1 and W2 are further inserted or wedged into the tapered passageway to further wedgingly engage and further secure the string S to the game ball racket frame F.

Referring now to FIGS. 9 through 12, there is shown a further embodiment of tweezer-wedges according to the present invention being identified by general numerical designation 100 and including three wedges, W1, W2 and W3 and three handles, H1, H2 and H3 for orienting and aligning the inner surfaces of the wedges axially and annularly with respect to each other. Further included are intermediate portions, I1, I2 and I3 of reduced cross section which are provided intermediate the rearward portions of the wedges and the forward portions of the handles and which intermediate portions facilitate the breaking off or away of the handles from the inserted wedges as do the intermediate portions, I1 and I2 of the earlier described embodiment. The rearward portions of the handles, H1, H2 and H3 are secured together, such as by integrally formed webs, W4 and W5, to provide pivots which in turn provide tweezer-like action to the wedges and handles as does the web, W3 of the earlier described embodiment.

In further comparison to the earlier described embodiment, and referring particularly to FIGS. 9 and 11, it will be understood that the opposed inner surfaces of the wedges, W1, W2 and W3, intermediate members, I1, I2 and I3, and handles, H1, H2 and H3 are substantially cylindrical and provide in combination a passageway P (FIG. 9) extending through the wedges, intermediate portions and handles. Upon the wedges and handles being spread apart about the pivots or webs W4 and W5 in tweezer-like action, the passageway P is for receiving the string S (FIG. 1) and upon the wedges and handles being closed about the pivots of webs W4 and W5 in tweezer-like action, the cylindrical inner surfaces of the wedges, intermediate members and handles align the inner surfaces of the wedges axially and annularly with respect to the string S.

The handles H1, H2 and H3, as with the earlier embodiment, are for being gripped by the hand of an operator to slide the aligned wedges along the string to insert the wedges into a tapered hole extending through the frame of a game ball racket to secure the end portion of the string S to the racket frame F.

It will be further understood that the structural detail of the tweezer-wedges embodiment shown in FIGS. 9 through 12 are the same as the corresponding structural detail of the tweezer-wedges shown in FIG. 6. Further, it will be understood that the tweezer-wedges embodiment 100 of FIGS. 9 through 12 also may be provided with the radially outwardly extending projections 64 and 66 shown in FIG. 8 to orient the handles with respect to the hand of the operator to facilitate the handles in being moved back and forth with respect to the inserted wedges through an arc residing in a plane substantially parallel to the opposed inner surfaces of the wedges to reduce any tendency of the inserted wedges to back out of the hole caused by any movement of the inserted wedges due to the breaking away of the intermediate members from the wedges.

Still further, it will be understood that as with regard to the opposed inner surfaces of the wedges W1 and W2 of the earlier described embodiment, the opposed inner surfaces of the wedges, W1, W2 and W3 may be tapered generally inwardly from the rearward to the forward end of the wedges whereby upon the wedges, intermediate members and handles pivoting away from each other about the web in tweezer-like action to permit the string S to be received in the passageway P, the opposed inner surfaces of the wedges are substantially parallel thereby enhancing the axial alignment of the inner surfaces of the wedges with the string upon the string being received within the passageway P.

It will be further understood by those skilled in the art that tweezer-wedges embodying the present invention may be provided with four or more wedges, handles and intermediate members and that the number of such members provided will be determined by the gripping characteristics desired from the wedges and the manufacturing limitations posed by practical and economic considerations.

Further, it will be understood by those skilled in the art that the tweezer-wedges of the present invention may be made of any suitable material such as aluminum, an aluminum alloy, plastic and combinations thereof, and that the specific material of which the tweezer-wedges are formed is not a part of this invention.

It will be still further understood by those skilled in the art that many variations and modifications may be made in the present invention without departing from the spirit and the scope thereof.

What is claimed is:

1. A racket string clamp for securing an end portion of a game ball string in a hole extending through the frame of a game ball racket, comprising:

integrally formed plurality of opposed wedges and handle means, said handle means defined by a plurality of handle members equal in number to said wedges, the rearward portions of said wedges and the forward portions of said handle members formed integrally and in a predetermined manner to provide a weakened joint, the rearward portions of said handle members formed integrally to provide a pivot about which said wedges and said handle members pivot toward and away from each other in tweezer-like action, said wedges and said handle members having inner surfaces providing in combination a passageway for receiving said string upon said wedges and handle members pivoting away from each other;

upon said string being received within said passageway said wedges and handle members pivoting towards each other and said passageway aligning the inner surfaces of said wedges and said handle members with respect to said string prior to the insertion of said wedges into said hole, and said handle means for being gripped by an operator to slide said aligned wedges and handle members along said string and to insert said wedges into said hole and to wedge said wedges between said string end portion and the racket frame surface defining said hole to secure said end portion of said string to said racket frame; and upon said end portion of said string being secured to said racket frame, said handle means for being moved back and forth with respect to said wedges by said operator to break said handle means away from said wedges at said weakened joint.

2. A racket string clamp, comprising:

a plurality of wedges for being inserted into a hole extending through a game ball racket frame and for being wedged between an end portion of a game ball string and the frame surface defining the hole to secure the end portion of the string to the racket frame;

handle means including a plurality of handle members equal in number to said wedges and formed integrally therewith to maintain said wedges in a predetermined relationship with respect to each other, said wedges and said handle members having inner surfaces providing in combination a passageway for receiving said string, said handle members having rearward portions formed integrally to provide a pivot about which in tweezer-like action said handle members and wedges pivot away from each other to provide said string with access to said passageway and about which said handle members and said wedges pivot toward each other to close said handle members and said wedges about said string upon being received in said passageway, upon said string being received within said passageway said wedges and said handle members being aligned with said string prior to the insertion of said wedges into said hole, and said handle means for being gripped by an operator to slide said aligned wedges and said handle members along said string and to insert and wedge said aligned wedges into said hole; and upon said wedges being wedged into said hole, said handle means for being moved back and forth with respect to said inserted wedges by said operator to break said handle means away from said wedges.

3. A racket string clamp, comprising:

a plurality of wedges having rearward portions and inner surfaces, said wedges for being wedged in a hole extending through the frame of a game ball racket and between an end portion of a game ball string and the racket frame surface defining the hole to secure the end portion of the string to the racket frame;

handle means including a plurality of handle members having inner surfaces and forward portions formed integrally with the rearward portions of said wedges to maintain the wedges in predetermined axial and annular alignment, the inner surfaces of the wedges and handle members providing in combination a passageway for receiving the string;

the handle members having rearward portions formed integrally to provide a pivot about which the wedges and handle members pivot to open and close in tweezer-like action, upon being opened the string is provided with access to the passageway and upon being closed the string is received within the passageway and the wedges and handle members are aligned axially with the string prior to the insertion of the wedges into the hole; and upon the string being received within the passageway the handle means are for being gripped by an operator to slide the aligned wedges and handle members along the string and to insert and wedge the wedges into the hole to secure the end portion of the string to the racket frame as said, and upon the wedges being wedged into the hole, the handle means are for being moved back and forth with respect to the inserted wedges to break the handle means away from the wedges.

4. A racket string clamp, comprising:

a plurality of opposed, tapered wedges provided with opposed inner surfaces and including rearward portions, the wedges for being inserted into a tapered hole extending through a game ball racket frame and for being wedged in said hole between the end portion of a game ball string and the racket frame surface defining the hole to secure the end portion of the string to the racket frame;

handle means including a plurality of opposed handle members including forward and rearward portions and provided with opposed inner surfaces, the forward portions of the handle members for being formed integrally with the rearward portions of the wedges in a weakened joint and to orient the inner surfaces of the wedges axially and annularly with respect to each other and the rearward portions of the handle members being formed integrally to provide a pivot which provides tweezer-like action to the wedges and handle members, the opposed inner surfaces of the wedges and the handle members provided respectively with opposed grooves which grooves provide in combination a passageway extending through the wedges and the handle members, and upon the wedges and handle members being spread apart about the pivot, the string is provided with access to the passageway and the passageway is for receiving the string, and upon the wedges and handle members being closed about the pivot, the inner surfaces of the wedges and handle members are aligned with respect to the string;

the handle means are for being gripped by the hand of an operator to slide the wedges and the handle members along the string to insert the wedges into the tapered hole and to wedge the wedges in the tapered hole, as said, to secure the end portion of the string to the racket frame; and upon the wedges being wedged into the tapered hole, the handles are for being moved back and forth with respect to the wedges by an operator to break the handle means away from the wedges.

5. A racket string clamp according to claim 4 wherein the handle means further includes means for orienting the handle members with respect to the hand of the operator to facilitate the handle means being moved back and forth with respect to the inserted wedges through an arc residing in a plane substantially parallel to the opposed inner surfaces of the wedges to reduce any tendency of the inserted wedges to back out of the hole caused by any movement of the inserted wedges due to the breaking away of the handle means from the wedges.

6. A racket string clamp, comprising:

a pair of opposed, spaced apart, tapered wedges provided with substantially conical outer surfaces, substantially cylindrical opposed inner surfaces providing a first pair of opposed grooves extending generally longitudinally of said wedges, and first and second pairs of opposed spaced apart, generally longitudinally extending edges, said wedges further provided with forward and rearward ends and said wedges for being inserted into a tapered hole extending through a game ball racket frame and for being wedged between an end portion of a game ball string and the racket frame surface defining said tapered hole to clamp and secure the end portion of the string to the racket frame;

handle means including:

(a) a pair of opposed, spaced apart, generally longitudinally extending, semi-cylindrical handles tapering toward each other and being linearly aligned with said wedges, said handles provided with forward and rearward ends and substantially cylindrical outer surfaces and substantially cylindrical opposed inner surfaces providing a second pair of opposed grooves extending generally longitudinally of said handles, and said handles further provided with first and second pairs of opposed, spaced apart, generally longitudinally extending edges;

(b) a pair of opposed, spaced apart intermediate members of reduced cross-section positioned intermediate said rearward ends of said wedges and said forward ends of said handles, said intermediate members being aligned linearly with respect to said wedges and said handles being formed integrally therewith, said intermediate members provided with substantially cylindrical outer surfaces and substantially cylindrical opposed inner surfaces providing a third pair of opposed grooves extending generally longitudinally of said intermediate members, said intermediate members further provided with first and second pairs of opposed, spaced apart, generally longitudinally extending edges;

(c) a generally semi-circular web having substantially cylindrical inner and outer surfaces, said web being formed integrally with said handles at said rearward ends thereof between the rearward ends of said second pair of edges provided on said handles, said web providing a pivot to permit said wedges, intermediate members and handles to pivot toward and away from each other in springy, tweezer-like action;

said first, second and third pairs of opposed grooves being aligned linearly and providing in combination a longitudinally extending internal passageway tapering generally inwardly from said rearward ends of said handles toward said forward end of said wedges;

said first pairs of opposed, spaced apart, generally longitudinally extending edges provided respectively on said wedges, intermediate members and handles being generally linearly aligned and providing in combination a longitudinal slot extending longitudinally the length of said handles, intermediate members and wedges and tapering generally inwardly from the rearward end of said handles toward the forward end of said wedges, said longitudinal slot opening into said internal passageway, the rearward portion of said longitudinal slot being wider than the diameter of said game ball string and the forward portion of said longitudinal slot being narrower than the diameter of said game ball string;

upon said game ball string being inserted into said wider rearward portion of said longitudinal slot and upon said string being forced against the opposed edges providing said narrower forward portion of said longitudinal slot, said wedges, intermediate members and said handles pivoting away from each other about said web to open said narrower portion of said longitudinal slot to permit said string to be received within said internal passageway, and upon said wedges and handles pivoting towards each other about said web, said internal passageway aligning said respective inner surfaces of said wedges, intermediate members and handles with respect to said game ball string;

upon said game ball string being received within said internal passageway, said outer surfaces of said handles for being gripped by the hand of an operator to slide said tweezer-wedges along said string and to insert said wedges into said tapered hole extending through said game ball racket frame; and upon said wedges being inserted into said tapered hole said handles for being moved back and forth with respect to said inserted wedges to cause said intermediate members of reduced cross-section to break off from said rearward ends of said wedges to separate said handles and intermediate members from said inserted wedges.

7. A racket string clamp according to claim 6 wherein said handles are further provided with radially outwardly extending projections formed on the rearward ends of said handles on said outer surfaces thereof, said projections extending generally radially outwardly and residing in a plane substantially perpendicular to said inner surfaces of said wedges, said projections for orienting said handles with respect to said hand of said operator to facilitate said handles in being moved back and forth with respect to said inserted wedges through an arc residing in a plane substantially parallel to said opposed inner surfaces of said wedges to reduce any tendency of said inserted wedges to back out of said hole caused by any movement of said inserted wedges due to said breaking away of said intermediate members from said wedges.

8. A racket string clamp according to claim 6 wherein said substantially cylindrical opposed inner surfaces provided on said tapered wedges taper generally inwardly from the rearward to the forward ends of said wedges whereby upon said wedges, intermediate members and handles pivoting away from each other about said web to open said narrower portion of said longitudinal slot to permit said string to be received within said internal passageway, said opposed inner surfaces of said wedges are substantially parallel thereby enhancing the alignment of said inner surfaces with said string upon said string being received within said passageway.

* * * * *